Oct. 24, 1944.  L. F. SARNES  2,361,361
VEHICLE BRAKE SIGNAL
Filed Sept. 3, 1940
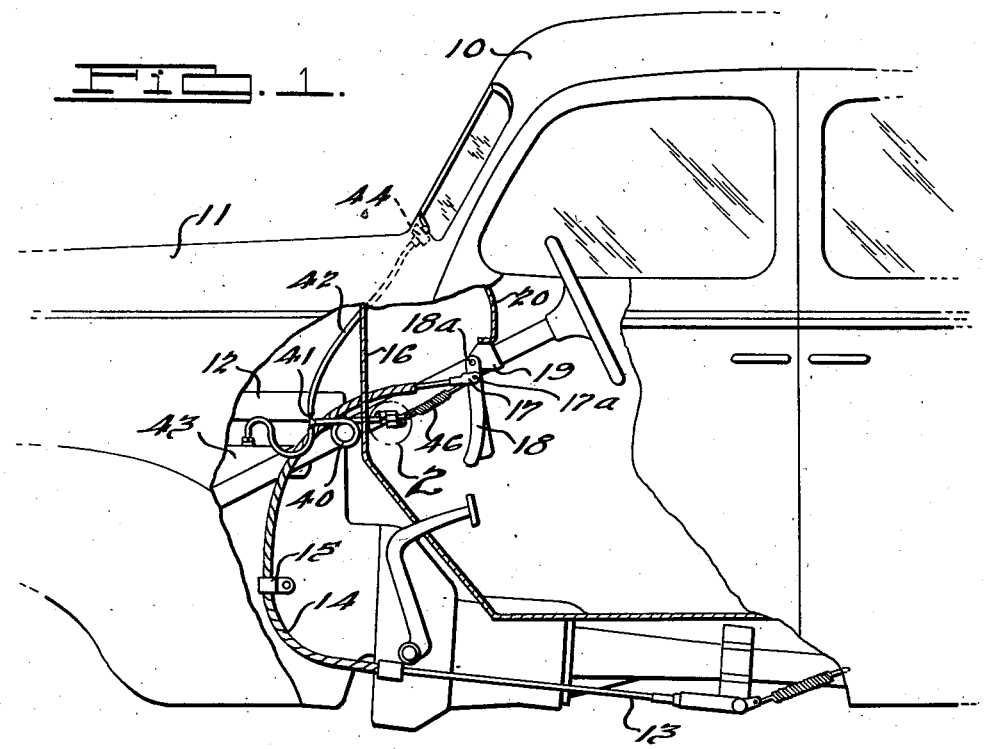
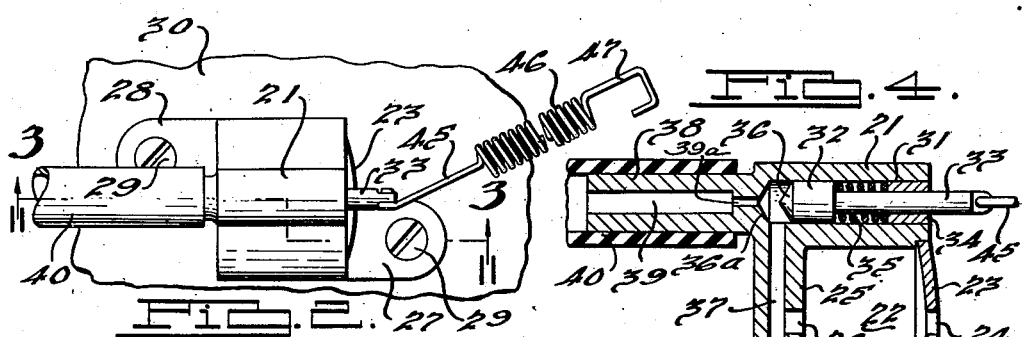
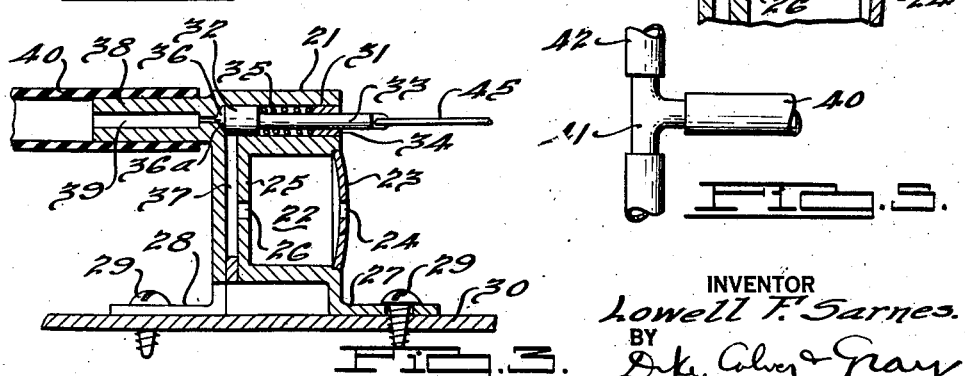
INVENTOR
Lowell F. Sarnes.
BY
Dike, Calver & Gray
ATTORNEYS.

Patented Oct. 24, 1944

2,361,361

UNITED STATES PATENT OFFICE 2,361,361

VEHICLE BRAKE SIGNAL

Lowell F. Sarnes, Dearborn, Mich.

Application September 3, 1940, Serial No. 355,106

3 Claims. (Cl. 116—58)

This invention relates to a new and novel brake warning signal particularly but not exclusively adapted for use in motor vehicles and is so constructed that when the engine of said vehicle is running an audible signal will warn the driver of the vehicle when the emergency hand brake member has not been wholly or partly released. This invention will be useful in preventing wear and destruction of brake lining caused by failure of the operator of the vehicle to release the emergency brake before placing the vehicle in motion.

An object of the invention is to provide a means automatically operable when starting a vehicle engine or while the engine is running to warn the driver of such vehicle that the emergency brake member has not been partly or wholly released.

Another object of the invention is to provide means automatically operable upon starting a vehicle engine or while the engine is running to warn the driver of the vehicle that the emergency brake member has not been partly or wholly released and means whereby the warning device may be released manually by the driver of said vehicle.

A still further object of the invention is to provide a vacuum actuated device connected to the engine manifold or other vacuum source of a motor vehicle, said device being operable to warn the driver of the vehicle that the vehicle brake has not been partly or wholly released.

A still further object of the invention is to provide an audible brake warning signal composed of a conventional noise producing means, such for example as a whistle, said signal to derive its operating power from the manifold vacuum of a vehicle engine and controllable by the setting or releasing of the emergency brake member.

A further object of the invention is to provide a device of relatively simple construction having a minimum number of moving parts and one which is capable of being produced at relatively low cost.

Other objects of this invention will appear in the following description and appended claims, reference being had to the accompanying drawing forming a part of this specification wherein like reference characters designate corresponding parts in the several views.

Fig. 1 is an elevated view of the side of a motor vehicle with parts removed to show an embodiment of the invention.

Fig. 2 is an enlarged elevated view of the section circled A in Fig. 1.

Fig. 3 is a vertical sectional view taken through line 3—3 of Fig. 2 looking in the direction of the arrows.

Fig. 4 is an enlarged vertical section similar to Fig. 3 showing the device in operating condition.

Fig. 5 is an enlarged elevated view of the T-connection between the signal device and the vacuum conduit for the windshield wiper to the engine manifold.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

For the purpose of illustrating the present embodiment of this invention an elevated sectional view of an automobile, Fig. 1, is shown. This comprises a conventional body 10, hood 11 and engine 12. A brake cable 13 sheathed by an armored conduit 14 supported by bracket 15 on the body is connected to brake member 18 through a clevis 17 pivoted to the member at 17a. Member 18 is in the form of a pivoted hand lever but may be of any conventional type for setting the so-called emergency or parking brake. Brake member 18 is pivoted at 18a to a bracket 19 mounted on dash 20.

The warning device shown in Figs. 3 and 4 comprises a body portion 21 provided with an annular chamber 22 having end walls 23 and 25 containing orifices 24 and 26. The wall 23 covers an aperture of chamber 22 and comprises a plug similar to a welch plug. Attached to body portion 21 are brackets 27 and 28 which are secured to an extension bracket 30 by screws 29. A cylinder 31 is disposed at one side of chamber 22. At one end of the cylinder or chamber 31 is located a taper valve seat 36a, and a reciprocal plunger 32 having a conical projection or valve portion 36 is adapted to engage in the valve seat 36a. A rod 33 attached to said plunger 32 and extending outwardly through the opposite end of said cylinder 31 through plug 34 is surrounded by a spring 35 which is adapted to normally maintain the valve projection 36 in its seat 36a. On the body portion 21 of the device in line with cylinder 31 is an extension or nipple 38 adapted to receive a flexible tube 40. Said extension 38 contains an axial passage 39 communicating with chamber 31 by means of a small diameter hole or passage 39a extending through the valve seat 36a. Chamber 31 in advance of the piston 32 communicates with a drilled conduit 37 located at the rear of chamber wall 22. The conduit or passage 37 in turn communicates with chamber 22 through port 26. Articulately attached to rod 33 is a hand brake connecting means comprising a rod or cable 45, a spring 46 and an end hook 47. The hook 47 is connected to the actuating brake member 18 at pivot 17a. The flexible tube 40 is connected to the engine manifold, or other engine controlled source of partial vacuum in any suitable manner. In the present instance the vacuum conduit 42 from the engine manifold 43 to the windshield wiper 44 is conveniently utilized. Flexible tube 40 is connected to the flexible tube 42 through the medium of a T-connection 41, as clearly illustrated in Fig. 5.

In the operation of the present signal device, when the driver of the vehicle pulls rearwardly on brake handle lever 18 to set the emergency brake, as is customary, tension results upon spring 46 which is articuately connected to rod 33, the latter in turn being connected to valve plunger 32. This results in drawing plunger 32 rearwardly away from valve seat 36a establishing communication between conduits 37 and 39. Rearward movement of the plunger places spring 35 under compression. This action permits the vacuum from manifold 43 to draw air from the atmosphere through orifice 24 of chamber wall 23 into chamber 22, through orifice 26 into conduit 37, thence into cylinder 31 and through the restricted passage or port 39a into the larger passage 39 and flexible tube 40. As the air is sucked through orifices 24 and 26 a noise, such as a soft whistle, is produced when the engine is operating whereby the operator of the vehicle is warned that his emergency brake has not been partly or wholly released. It will be noted that the diameters of orifices 24 and 26 are of a different seize than the diameter of port or passage 39a. A definite relationship between the diameter sizes of said orifices and said port has been established whereby port 39a is adapted to meter the amount of air flowing through orifices 24 and 26 to effect an audible noise of a predetermined tone. At the same time the capacity for volume of air flowing through said port 39a is sufficiently small so as not to adversely affect the operation of the engine.

It will be noted that the valve spring 35 is materially lighter than spring 46, so that spring 35 will only allow valve 32 to be seated to close off passage 37, 39 when the brake handle lever 48 is in its forward fully released position and spring 46 is relieved of any tension effective to overcome the tension of spring 35. When the brake lever 48 is pulled rearwardly to any position capable of setting the brakes, the large connecting spring 46 overcomes the pressure or resistance of the small valve spring and unseats valve 32. This allows air to rush through the whistle hole 24 which is designed to produce an audible but soft whistling noise warning the driver that the emergency brake is on.

I claim:

1. In a warning signal for a vehicle brake having a manually operable member shiftable into positions to set the brake, an air operated whistle device, a conduit connecting said device to the vehicle engine manifold, a shiftable spring actuated valve for opening and closing said conduit, said valve having a limit of movement independent of the movement of said member, and a direct connection between said valve and member including a spring having a greater deflection rate than the valve spring and effective to shift the valve and open communication through said conduit between the whistle device and engine manifold when said member is shifted to a brake setting position.

2. In a warning signal for a vehicle brake having a manually operable member shiftable into positions to set the brake, an air operated whistle device, a conduit connecting said device to the vehicle engine manifold, a shiftable plunger, a spring urging said plunger into position to interrupt said conduit, and a direct connection between said plunger and member including in its length a heavier spring than the plunger spring whereby when said member is shifted to set the brake said plunger is shifted against the action of its spring to open said conduit, said member having a range of brake setting operation independent of the range of travel of said plunger.

3. A warning signal device for a vehicle emergency brake adapted to operate by means of the vacuum system of the vehicle, said device comprising a body portion having a chamber formed therein, said chamber having a wall provided with a whistle orifice communicating with the atmosphere, a cylinder disposed at one side of said chamber, an extension on said body portion having a passage communicating with said cylinder and also connected to the engine manifold, a valve seat located in said cylinder, a reciprocal plunger located within the cylinder and adapted to engage said seat, a spring adapted to normally maintain said plunger on its seat, said body portion having a passageway formed therein opening communication between said passage and said orifice, and means including a heavier spring than said plunger spring directly connecting said plunger and a brake actuating member of the vehicle for shifting the plunger from its seat against the action of its spring whereby to permit the passage of air from the atmosphere through said orifice and passageway into the intake manifold of the vehicle engine.

LOWELL F. SARNES.